United States Patent

Soh et al.

[11] Patent Number: 5,861,691
[45] Date of Patent: Jan. 19, 1999

[54] STARTER WITH THERMAL INSULATION COVER

[75] Inventors: Masahiro Soh, Anjo; Keiichi Matsushima, Kariya, both of Japan

[73] Assignee: Denso Corporation, Kariya, Japan

[21] Appl. No.: 833,800

[22] Filed: Apr. 9, 1997

[30] Foreign Application Priority Data

Apr. 12, 1996 [JP] Japan .................................... 8-091444
Jun. 20, 1996 [JP] Japan .................................... 8-159343

[51] Int. Cl.⁶ .................................. H02K 5/00; H02K 5/24
[52] U.S. Cl. ................................ 310/89; 310/51; 310/59; 310/64; 310/67 R
[58] Field of Search .................................. 310/51, 58, 59, 310/89, 67 R, 85, 64, 42, 258

[56] References Cited

U.S. PATENT DOCUMENTS

| 4,117,359 | 9/1978 | Wehde | 310/67 R |
| 4,626,724 | 12/1986 | Morishita et al. | 310/88 |
| 4,737,673 | 4/1988 | Wrobel | 310/90 |
| 5,233,248 | 8/1993 | Kawamura et al. | 310/88 |
| 5,235,227 | 8/1993 | Fazekas | 310/51 |
| 5,334,897 | 8/1994 | Ineson et al. | 310/89 |
| 5,530,304 | 6/1996 | Mirumachi et al. | 310/51 |
| 5,616,973 | 4/1997 | Khazannov et al. | 310/54 |

FOREIGN PATENT DOCUMENTS 61-101457   6/1986   Japan .

*Primary Examiner*—Thomas M. Dougherty
*Assistant Examiner*—Tran N. Nguyen
*Attorney, Agent, or Firm*—Pillsbury Madison & Sutro LLP

[57] ABSTRACT

In a starter having a motor yoke, a housing and an end frame forming a cylindrical starter frame, a cylindrical thermal insulation cover is fitted around the starter frame through rubber-made elastic rings. The rings are tightly fitted in V-shaped grooves formed circumferentially on fitting faces, one being between the housing and the yoke and the other being between the yoke and the end frame. Each ring is pressed radially inward by a large diameter part of the thermal insulation cover to fill in the V-shaped groove and contact the fitting face. Further, in a motor for the starter, a resilient plate sheet is disposed between a commutator and a brush holder to return a brush passing therethrough to the original position when the brush tends to move during sliding contact with the commutator.

21 Claims, 6 Drawing Sheets

STARTER WITH THERMAL INSULATION COVER

BACKGROUND OF THE INVENTION

1. Field of the Invention

The present invention relates to a starter having a thermal insulation cover for thermal insulation from an engine or an exhaust pipe.

2. Background of the Invention

It is a recent tendency to install more auxiliary equipment than before in the engine compartment of an automotive vehicle. A starter has to be mounted in the engine compartment more closely to an engine block or to an engine exhaust pipe. The starter is therefore subjected to heat radiation from the engine and the exhaust pipe. As a result, resin-made parts (e.g., molded cover of a magnet switch), rubber-made parts and the like used in the starter are very likely to be damaged due to thermal softening or thermal degradation.

Japanese Utility Model Laid-open Publication No. 61101457 proposes to surround at least a part of the starter outer periphery with a thermal insulation cover. The thermal insulation cover is fixed to the starter with its engagement portions formed in a semicylindrical or hook shape by punching being engaged with a through bolt which tightly holds an end frame and a housing. The heat-shielding cover thus engaged with the through bolt via the engagement portions will possibly produce chattering or backlash noise sounds due to engine vibration and cause cracks in the thermal insulation cover due to the vibration.

Further, brushes movably held in respective brush holders collide with the brush holders during sliding contact with a commutator, particularly when the engine vibration is transmitted. This will cause local wear of the brushes at the colliding parts, cracks in the brushes and the like.

SUMMARY OF THE INVENTION

It is therefore an object of the present invention to suppress noise and cracks caused by engine vibration in a starter having a thermal insulation cover which shields heat from an engine or exhaust pipe.

It is a further object of the present invention to suppress local wear and cracks of brushes.

According to the present invention, a thermal insulation cover is held via elastic members around a frame of a starter. The elastic members absorb vibration from the starter which vibrates with an engine and suppress the vibration which would otherwise be transmitted to the thermal insulation cover, thus reducing chattering noise and cracks caused by the vibration.

Preferably, the elastic member is formed in a ring shape and disposed in tight contact with the outer periphery of the frame and the inner periphery of the thermal insulation cover along the entire circumference of the frame. The elastic member is disposed in at least two locations spaced apart axially. One elastic member is disposed on the outer periphery of the abutting portion between a starter housing and a starter yoke or on a portion which is closer to the housing than the abutting portion. Another elastic member is disposed on the outer periphery of the abutting portion between the starter yoke and a starter end frame or on the a portion which is closer to the end frame than the yoke. Thus, each elastic member prevents water from entering into the inside of the housing through fitting faces between the housing and the yoke and between the end frame and the yoke.

Preferably, the thermal insulation cover is formed in a cylindrical shape having a bottom which substantially covers the axial end surface of the end frame and surrounds the entirety of the rear side of the starter from the housing end side near the yoke to the end frame through the yoke. This thermal insulation cover shape is more advantageous than a simple cylindrical shape in enhancing the thermal insulation effect and water-proofing effect.

Further, in a motor for the starter, a resilient sheet is disposed between a commutator and a brush holder to return a brush passing therethrough to its original position when the brush tends to move during sliding contact with the commutator.

BRIEF DESCRIPTION OF THE DRAWINGS

Other objects, features and advantages of the present invention will become more apparent from the following detailed description when read with reference to the accompanying drawings, in which.

DETAILED DESCRIPTION OF PRESENTLY PREFERRED EMBODIMENT

Figure 1:
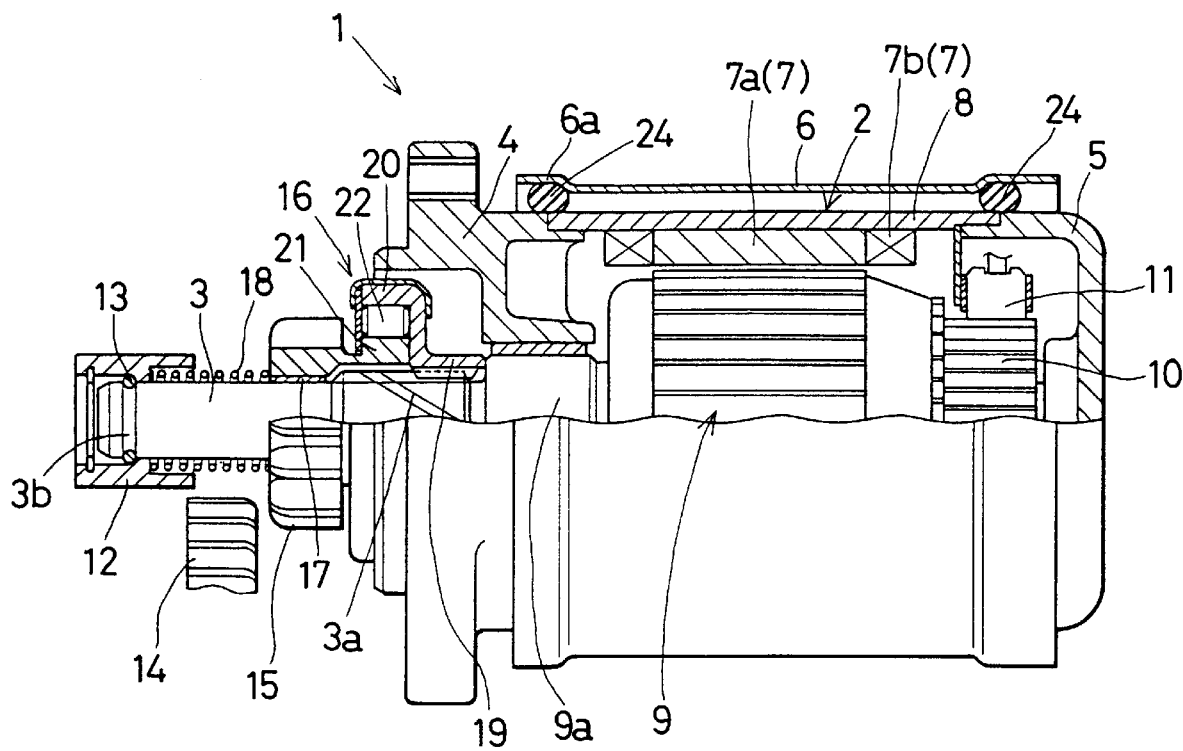
FIG. 1 is a side view, partly in section, of a starter according to a first embodiment of the present invention.

The present invention will be described in detail hereunder with reference to various embodiments shown in the drawings, in which the same or like parts are designated by the same reference numerals throughout the embodiments.

(First embodiment)

As shown in FIG. 1, a starter 1 comprises primarily a starter motor 2 for producing a rotary force, an output shaft 3 driven rotatably by the starter motor 2, a pinion moving member (described hereunder) fitted slidably on the output shaft 3, a housing 4 surrounding the front side (left side in the figure) of the starter motor 2, an end frame 5 surrounding the rear side of the starter motor 2, and a thermal insulation cover 6 made of metal for shielding the heat from an engine and an exhaust pipe.

The starter motor 2 is a d.c. motor, the energization of which is controlled by an external switch (not shown) in a manner well-known in the art, and includes a field magnetic device (pole core 7a and field coil 7b), a cylindrical yoke 8 supporting fixedly the field magnetic device 7 on the radially inner side thereof, an armature 9 supported rotatably in the radial inside of the field magnetic device 7, a commutator 10 disposed at one axial side of the armature 9, brushes 11 held in sliding contact with the commutator 10, and the like. The yoke 8 is sandwiched between the housing 4 and the end frame 5, which are disposed axially forward and rearward, and constitutes a frame of the starter 1 together with the housing 4 and the end frame 5. The pole core 7a and the field coil 7b of the field magnetic device 7 may be replaced by permanent magnets.

The output shaft 3 is disposed coaxially with a rotary shaft 9a of the armature 9 to rotate therewith. A helical spline 3a is formed around the outer periphery of the output shaft 3. A stopper collar 12 is fitted on the front end part (leftmost end part in the figure) of the output shaft 3 to restrict forward movement of the pinion moving member. A snap ring 13 is fitted in a circumferential groove 3b formed around the frond end of the output shaft 3 to restrict the stopper collar 12 from moving toward the axially forward end side.

The pinion moving member includes a pinion 15 engageable with an engine ring gear 14 to transmit the rotating force of the armature 9 (rotation of the output shaft) to the ring gear 14, and a one-way clutch 16 for transmitting the rotation of the output shaft 3 to the pinion 15.

The pinion 15 is fitted rotatably around the outer periphery of the output shaft 3 through a bushing 17 and slidably movable along the output shaft 3 together with the bushing 17. A spring 18 is disposed between the pinion 15 and the stopper collar 12 to normally bias the pinion moving member rearward (in the right direction in the figure).

The one-way clutch 16 includes a spline tube 19 enmeshed with the helical spline 3a of the output shaft 3, an outer member 20 formed integrally with the spline tube 19, an inner member 21 formed integrally with the pinion 15 and disposed radially inside the outer member 20, and rollers 22 interposed between the outer member 20 and the inner member 21. The one-way clutch 16 transmits the rotation of the output shaft 3 transmitted to the spline tube 19 (i.e., outer member 20) through the helical spline 3a to the inner member 21 (i.e., pinion 15) through rollers 22.

Figure 2:
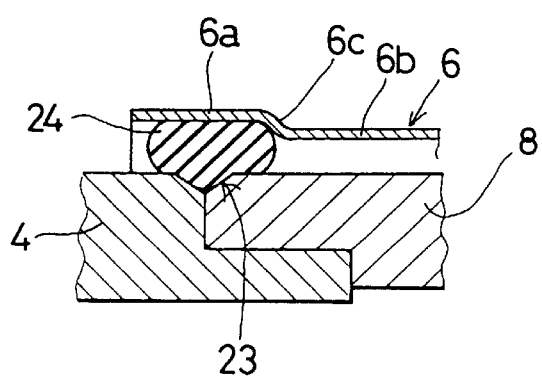
FIG. 2 is a sectional view showing a fitting condition of an elastic ring used in the first embodiment.

The housing 4 has a yoke-side outer diameter which is substantially the same as that of the yoke 8, and the end frame 5 has a yoke-side outer diameter which is substantially the same as that of the yoke 8. Thus, the frame of the starter 1 is formed substantially in a cylindrical shape from the housing 4 near the yoke 8 to the end frame 5 near the yoke B8. As shown in FIG. 2, a V-shaped groove 23 is formed circumferentially on each of the outer peripheries of fitting faces between the housing 4 and the yoke 8 and between the yoke 8 and the end frame 5.

The thermal insulation cover 6 is provided in a cylindrical shape around the outer peripheral surface of the cylindrical frame and spaced apart radially a predetermined distance from the frame by a pair of elastic members, i.e., rubber rings 24. The thermal insulation cover 6 has different outer diameters between the axial end parts and the central part thereof. That is, the cover 6 has a pair of large diameter parts 6a at both axial ends thereof and a small diameter part 6b at the axially central part. The inner diameter of the large diameter part 6a is, however, made slightly smaller than the outer diameter of the ring 24.

Figure 3:
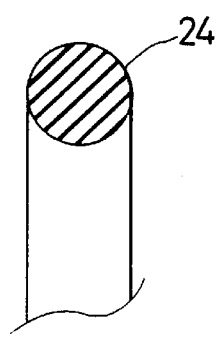
FIG. 3 is a cross sectional view of the elastic ring.

The ring 24 is shaped, as shown in FIG. 3, in a generally circular shape in cross section and has substantially the same inner diameter as the outer diameter of the cylindrical frame. The ring 24 is fitted in the V-shaped groove 23 formed around the frame and held in contact with the radially inner face of the large diameter part 6a of the thermal insulation cover 6. As the inner diameter of the large diameter part 6a of the cover 6 is slightly smaller than the outer diameter of the ring 24, the ring 24 is fitted tightly in the V-shaped groove 23 and fixed between the outer peripheral surface of the frame and the inner peripheral surface of the large diameter part 6a in a compressed condition keeping resiliency.

The thermal insulation cover 6 also has a stepped part 6c between the large-diameter part 6a and the small diameter part 6b so that the stepped part 6c contacting the ring 24 restricts the movement of the ring 24 toward the small diameter part 6b. Thus, the thermal insulation cover 6 is restricted in position relative to the ring 24. Further, as the ring 24 is pressed to the frame to fill in the V-shaped groove 23, the ring 24 is restricted from moving axially. Still further, as the ring 24 is made of rubber and provides friction between the cover 6 and the frame, the cover 6 is held fixedly in position around the frame by the two rings 24.

The starter 1 according to this embodiment operates as follows.

When electric power is supplied to the starter motor 2 through the external switch, the armature 9 rotates and drives the output shaft 3. Through the operation of the helical spline 3a and the inertia of the one-way clutch 16, the pinion moving member advances along the output shaft 3 to engage the pinion 15 with the ring gear 14. As a result, the rotation of the output shaft 3 is transmitted from the pinion 15 to the ring gear 14, which in turn starts the engine.

According to the first embodiment, the thermal insulation cover 6 disposed around the cylindrical frame reflects a part of the heat radiation from the engine and the exhaust pipe. As the cover 6 is spaced away radially from the outer peripheral surface of the frame to have an air space therebetween, that is, the cover 6 is not in direct contact with the frame, it is less likely that the radiated heat received by the cover 6 is transferred to the starter frame. Thus, the starter 1 can be protected from the high temperature environment.

As the cover 6 is fitted around the starter frame through the rubber-made rings 24, the rings 24 absorb vibration to suppress the influence of the vibration transmitted to the cover 6 even when the starter 1 vibrates while receiving the vibration of the engine. Thus, generation of chattering sound noise and cracks are reduced effectively.

As the rubber-made rings 24 tightly cover the outer peripheries of the fitting faces between the housing 4 and the yoke 8 and between the yoke 8 and the end frame 5, water is restricted from entering the inside of the frame through the fitting faces even in case the starter 1 is subjected to the splash of water during running of a vehicle on water-covered road or car washing.

(Second Embodiment)

Figure 4:
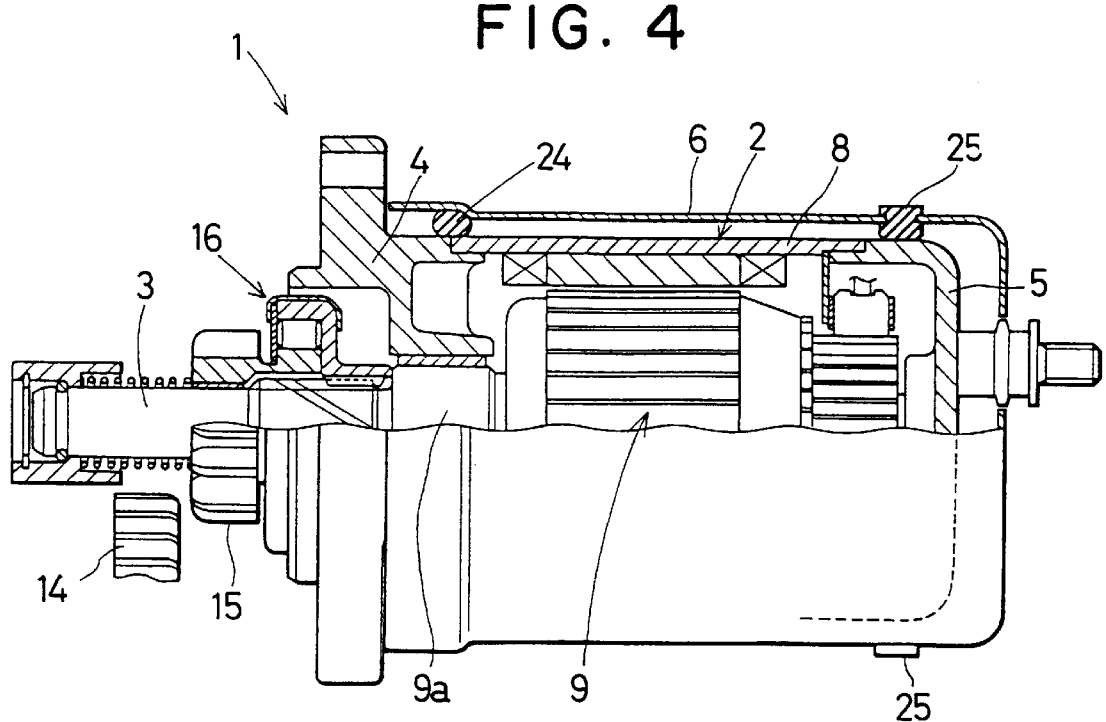
FIG. 4 is a side view, partly in section, of a starter according to a second embodiment of the present invention.

In this embodiment shown in FIG. 4, the thermal insulation cover 6 is formed to surround the end frame 5 up to the rearmost side of the end frame 5.

Figure 5:
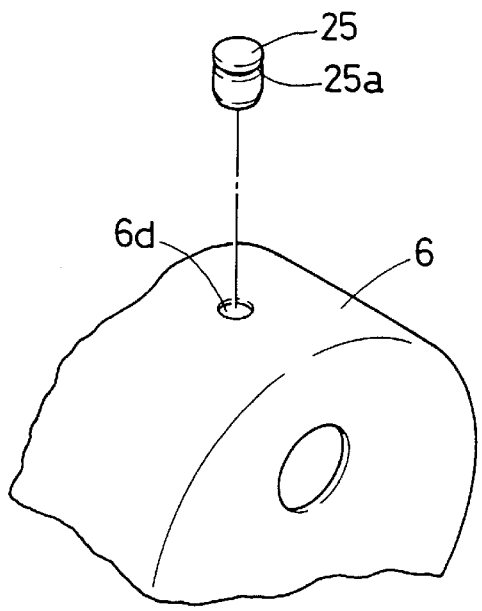
FIG. 5 is a perspective view of an elastic member in the second embodiment.

The elastic member used at the side of the housing 4 is the same ring 24 as in the first embodiment, while the elastic member used at the side of the end frame 5 is formed as a rubber plug 25 as shown in FIG. 5. The plug 25 is used at a plurality of locations (4 locations spaced apart 90 degrees from the adjacent one) along the circumference of the end frame 5. The plug 25 is formed with a choked part 25a around the outer periphery thereof to be attached through a hole 6d formed in the cover 6.

In this embodiment as well, the starter 1 can be protected from the high temperature environment and water splash and generation of chattering noise and cracks can be reduced as in the first embodiment.

(Modification of Elastic Member)

Figure 15:
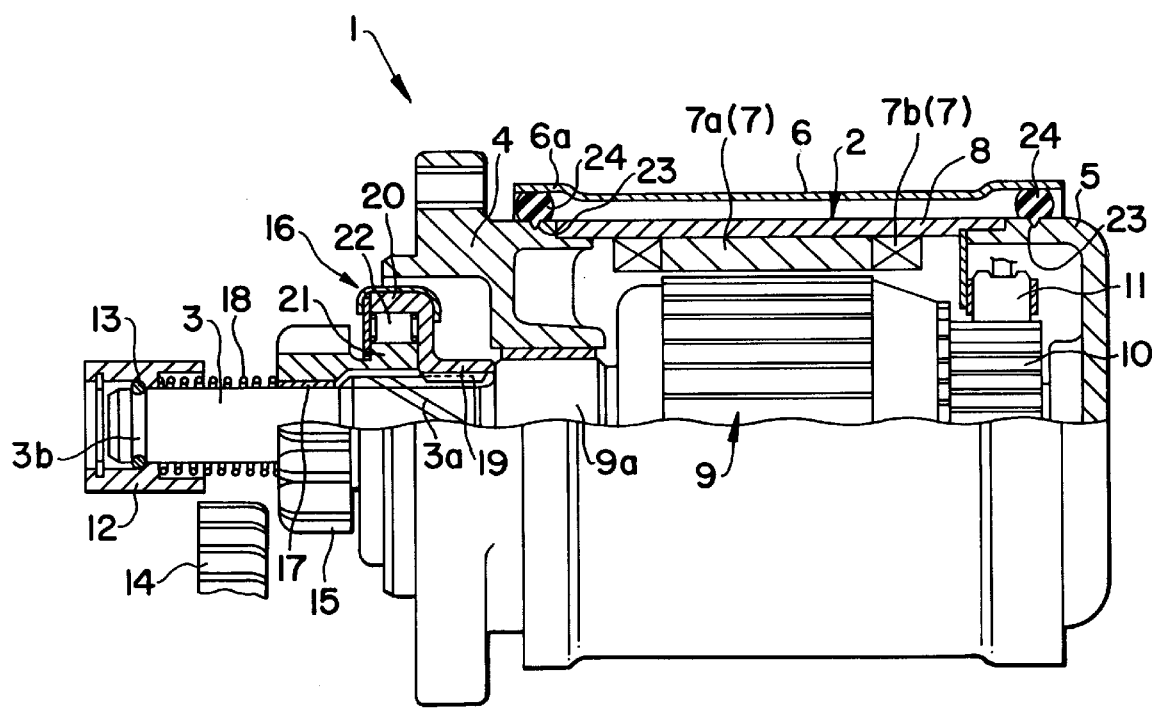
FIG. 15 is a side view, partly in section, of a starter according to yet another variation of the first embodiment.

The V-shaped groove 23 in the first and the second embodiments need not be formed on the fitting part between the housing 4 and the yoke 8, but may be formed circumferentially around the housing 4 only so that the rubber-made ring 24 are fitted in the groove 23 as shown in FIG. 15. As far as the ring 24 is fitted in contact with or axially outside the fitting face between the housing 4 and the yoke 8, the same water-proofing effect can be provided. In the same manner as above, the V-shaped groove 23 and the ring 24 provided at the side of the end frame 5 in the first embodiment may be provided only on the end frame 5 as far as the fitting part between the yoke 8 and the end frame 5 is located axially inside the ring 24 as is also shown in FIG. 15.

Figure 6:
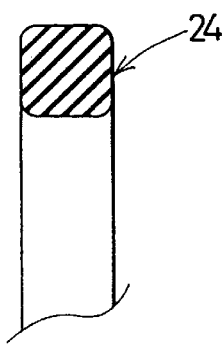
FIG. 6 is a cross sectional view of a ring according to a modification of the embodiments.
Figure 7:
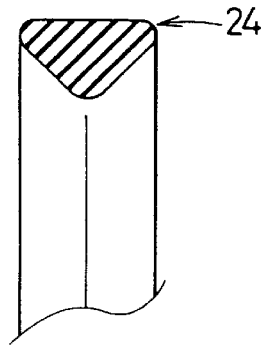
FIG. 7 is a cross sectional view of a ring according to another modification of the embodiments.

The rubber-made ring 24 need not be in a circular shape in cross section, but may be in a rectangular shape shown in FIG. 6 or in a triangular shape shown in FIG. 7.

The starter 1 may be a type in which a magnet switch for controlling the electric power supply to the starter motor 2 is disposed coaxially with the rotary shaft 9a of the armature 9.

(Modification of Starter Motor)

Figure 8:
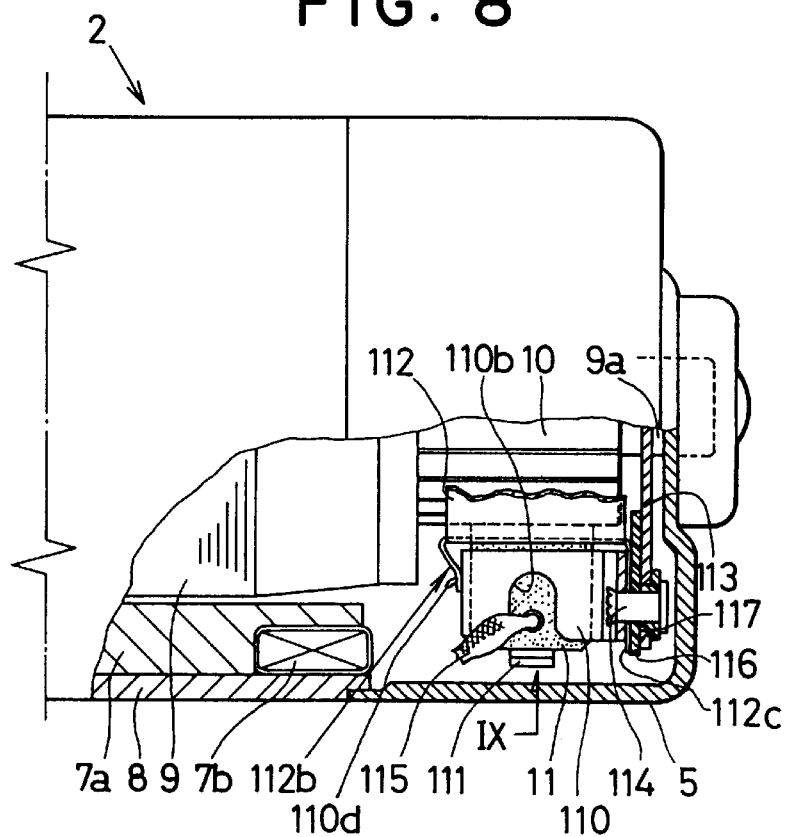
FIG. 8 is a partial side view, partly in cross section, of a starter according to a further modification.

In the starter motor 2 shown in FIG. 8, each brush device includes a brush holder 110 holding the brush 11 movably therethrough, a spring 111 biasing the brush 11 toward the commutator 10, and a thin plate sheet 112 disposed between the commutator 10 and the brush holder 110.

Figure 9:
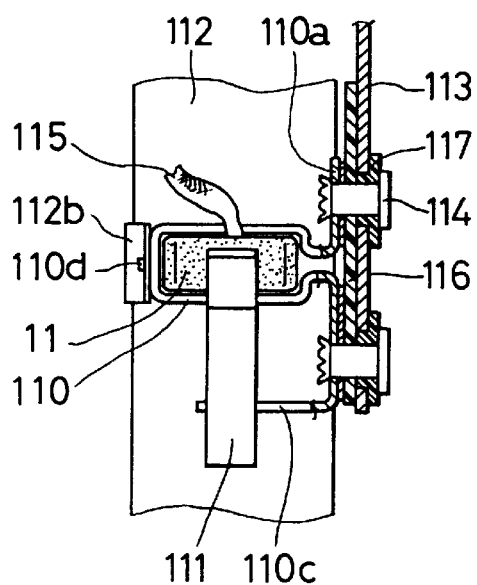
FIG. 9 is a bottom view of a brush device viewed in the direction IX in FIG. 8.

The brush holder 110 is formed in a tubular shape to surround an outer periphery of the brush 11 and hold the brush 11 movably in the longitudinal direction of the holder 110. That is, a clearance is provided between the outer periphery of the brush 11 and the inner periphery of the brush holder 110. The brush holder 110 has, as shown in FIG. 9, an attachment part 110a branched from the tubular brush holding part and fixed to a holder plate 113 through rivets 114. A cut-out 110b (FIG. 8) is formed in one side wall of the brush holder 110 so that a lead wire 115 connected to the brush 11 is taken out therethrough.

The holder plate 113 is fixed via screws to the end frame 5 which covers the rear side of the motor 2. One end of a plate spring 111 is supported by an end part 110c (FIG. 9) extending from the attachment part 110a of the brush holder 110 and the other end thereof presses the end of the brush 11 to bias the brush 11 toward the commutator 10.

Figure 10:
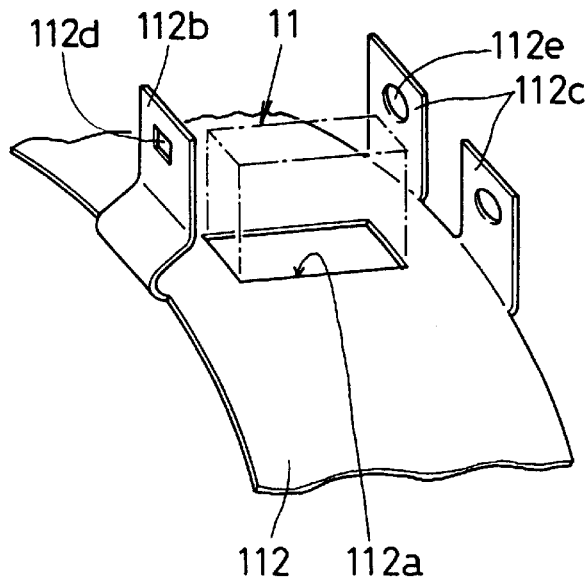
FIG. 10 is a perspective view of a sheet used for the brush device.

The sheet 112 is made of a material including an aromatic polyamide fiber which has a high tearing strength, heat resistivity and bendability and provided in a circular ring shape to surround the outer circumferential surface of the commutator 10. The sheet 112 has, as shown in FIG. 10, a rectangular opening 112a for receiving the brush 11 therethrough. The shape of the opening 112a corresponds to the rectangular peripheral shape of the brush 11 so that the outer periphery of the brush 11 contacts the inner periphery of the sheet 112. Alternatively, a clearance which is smaller than that between the outer periphery of the brush 11 and the inner periphery of the brush holder 110 may be provided between the outer periphery of the brush 11 and the periphery of the opening 112a. Between the commutator 10 and the brush holder 110, the sheet 112 has support tongues 112b and 112c on the axial sides thereof. The support tongue 112b at one axial side is supported by the brush holder 110 by engaging a hole 112d formed in the tongue 112b with a hook 110d formed on the side of the brush holder 110. The support tongues 112c at the other axial sides are sandwiched between the attachment part 110a of the brush holder 110 and a holder plate 113, and fixed by the rivets 114 passing through circular holes 112e. One of the brushes 11, i.e., positive-polarity side brush 11, is insulated electrically from the rivet 114 and the holder plate 113 by an insulating plate 116 interposed between the brush holder 110 and the holder plate 113 and by an insulating bushing 117 fitted around the rivet 114.

In operation, with the clearance between the brush 11 and the brush holder 110, the brush 11 is held movable within the brush holder 110 in not only the radial direction relative to the commutator 10 but also the circumferential direction, i.e., rotational direction, of the commutator 10. Therefore, in case the starter vibrates receiving vibration from the engine running at high speeds, the brush 11 responsively tends to move in the brush holder 111 in the direction of sliding on the commutator 10.

Because the brush 11 is received in the opening 112a of the sheet 112 between the commutator 10 and the brush holder 110, the sheet 112 flexes in the direction of movement of the brush 11 by an amount corresponding to the movement of the brush 11 when the brush 11 moves on the commutator 10. The sheet 112 having resiliency tends to return to its original shape thereby to return the brush to its original position. That is, the movement of the brush 11 near the sliding contact area with the commutator 10 is restricted so that the brush 11 is restricted from colliding with the brush holder 110. Thus, local wear, cracking or chipping of the brush 11 which would otherwise be caused by the collision will be suppressed. Further, chattering or backlash of the brush 11 within the brush holder 110 during the starter operation is suppressed as well, resulting in less chattering noise and less degradation of commutation performance.

As the sheet 112 circumferentially surrounds the sliding contact area between the commutator 10 and the brush 11, abrasion powder produced by the brush 11 during the sliding contact with the commutator 10 may be received by the sheet 112 to some extent. As a result, electrical short-circuiting which will be caused by local accumulation of the abrasion powder in the motor 2 can be avoided. Particularly, because the sheet 112 covers the sliding contact area at which the abrasion powder is produced, diffusion or scattering of the abrasion powder is suppressed. Thus, it becomes less likely that the abrasion powder adheres to the bearing part and degrades bearing performance.

Figure 11:
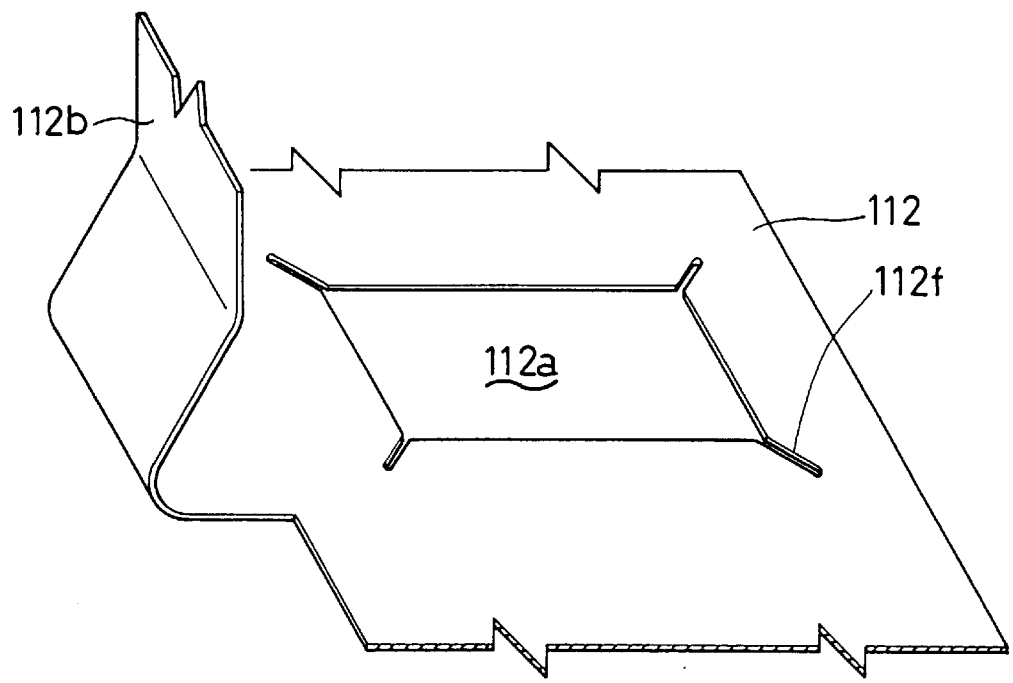
FIG. 11 is a perspective view of another sheet used for the brush device.
Figure 12:
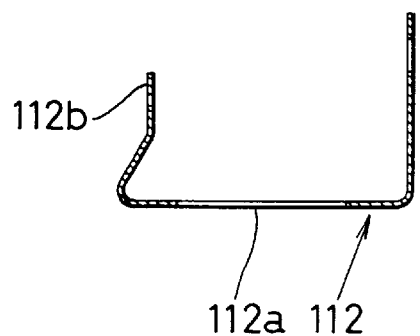
FIG. 12 is a cross sectional view of the sheet shown in FIG. 11.
Figure 13:
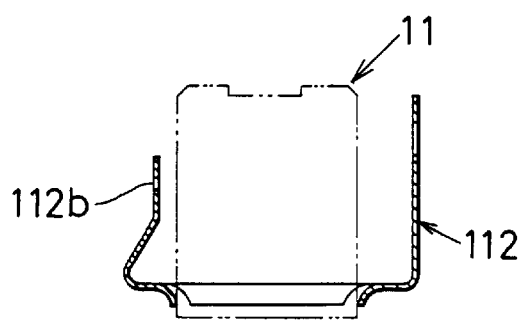
FIG. 13 is a cross sectional view of the sheet with a brush inserted therethrough.
Figure 14:
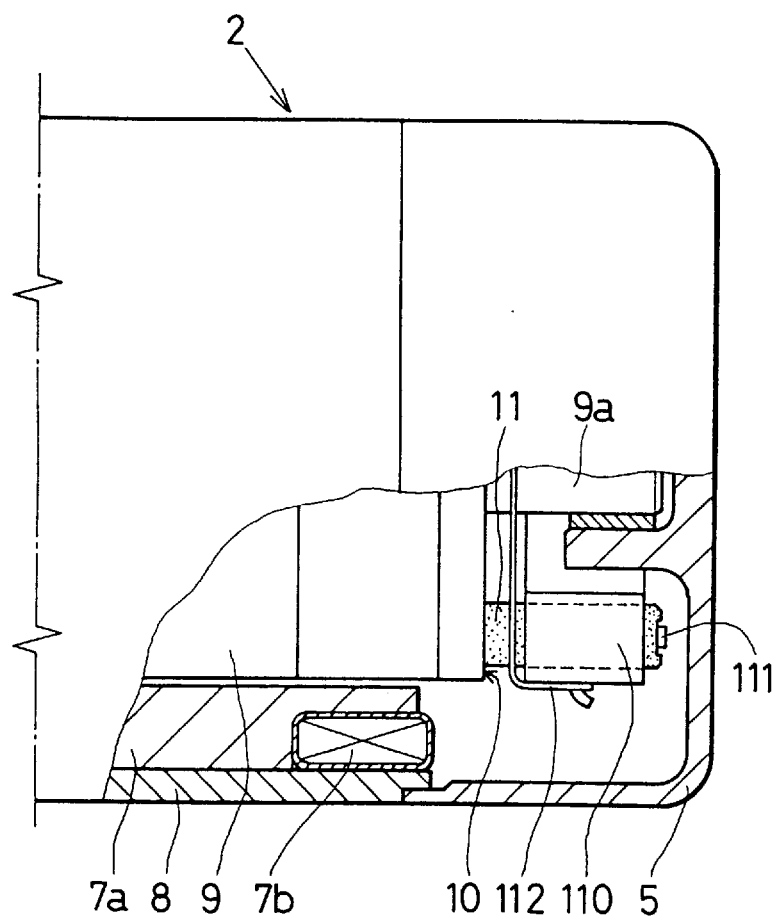
FIG. 14 is a partial side view, partly in cross section, of a starter according to a still further modification.

As an alternative to the sheet 112, as shown in FIG. 11, the rectangular opening 112a may be shaped smaller than the brush 11 and a cut or slit 112f may be provided at each corner of the opening 112a. The inner peripheral parts of the sheet 112 is thus changed from the shape shown in FIG. 12 to that shown in FIG. 13 in correspondence to the peripheral shape of the brush 11 when the brush 11 is inserted into the opening 112a. In this case, the size of the opening 112a needs not be matched accurately to the size of the brush 11, while enabling the outer peripheral surface of the brush 11 to keep contact with the inner peripheral parts of the sheet 112.

The commutator 10 may be so arranged that its commutating surface is perpendicular to the shaft 9a of the armature 9. In this case also, the sheet 112 may be disposed between the commutator 10 and the brush holder 110 and the brush 11 may be received through the opening 112a.

Further, the sheet 12 may be made of any material as long as it a thin resilient plate. Still further, the sheet 12 may be disposed for each brush to surround the sliding contact area and its neighboring area.

The present invention is not limited to the disclosed embodiments and modifications but may be varied in various ways without departing from the spirit and scope of the invention.

What is claimed is:

1. A starter comprising:

a yoke forming a magnetic path for a starter motor;

a housing and an end frame attached to respective axial end sides of the yoke and forming a starter frame together with the yoke, the starter frame having a yoke-side part of the housing and a yoke-side part of the end frame;

a thermal insulation cover made of metal and surrounding an outer peripheral surface of the starter frame; and at least one elastic member disposed between the starter frame and the thermal insulation cover and supporting the thermal insulation cover to be radially spaced apart from the starter frame;

wherein each elastic member in said at least one elastic member has a ring shape, is fitted circumferentially around the starter frame and is in tight contact with the outer peripheral surface of the starter frame and an inner peripheral surface of the thermal insulation cover;

said at least one elastic member includes two elastic members respectively fitted at first and second locations axially spaced away from each other;

the first location is one of an abutting portion between the housing and the yoke and a housing portion axially outside the yoke;

the second location is one of an abutting portion between the yoke and the end frame and an end frame portion axially outside the yoke;

the thermal insulation cover has a central part located around the yoke and a first axial end part located around the first location;

an inner diameter of the central part is smaller than that of the first axial end part; and an outer diameter of the elastic member is larger than the inner diameter of the first axial end part.

2. The starter according to claim 1, wherein the thermal insulation cover has an end portion which substantially surrounds an axial end surface of the end frame.

3. The starter according to claim 1, wherein:

a groove is formed circumferentially at the first location on the outer peripheral surface of the starter frame; and the elastic member is fitted on the groove with the outer peripheral surface thereof being pressed radially inward by the first axial end part to fill in the groove.

4. The starter according to claim 1, wherein:

the thermal insulation cover has a stepped part between the first axial end part and the central part; and the stepped part is in tight contact with the elastic member.

5. The starter according to claim 1, wherein:

the thermal insulation cover further has a second axial end parts located respectively around the second location;

an inner diameter of the central part is smaller than that of the second axial end part; and an outer diameter of the elastic member is larger than the inner diameter of the second axial end part.

6. The starter according to claim 5, wherein:

first and second grooves are formed circumferentially at the first and second locations on the outer peripheral surface of the starter frame respectively; and the elastic member is fitted on each of the first and second grooves with the outer peripheral surface thereof being pressed radially inward by the first and second axial end parts to fill in the first and second grooves.

7. The starter according to claim 5, wherein:

the thermal insulation cover has first and second stepped parts between the first axial end part and the central part and between the second axial end part and the central part, respectively; and the first and the second stepped parts are in tight contact with respective ones of the elastic members.

8. A starter comprising:

a yoke forming a magnetic path for a starter motor;

a housing and an end frame attached to respective axial end sides of the yoke and forming a starter frame together with the yoke, the starter frame having a yoke-side part of the housing and a yoke-side part of the end frame;

a thermal insulation cover surrounding an outer peripheral surface of the starter frame; and at least one elastic member, made of a material more elastic than a material from which the thermal insulation cover is made, disposed between the starter frame and the thermal insulation cover and supporting the thermal insulation cover to be radially spaced apart from the starter frame;

wherein said at least one elastic member includes two elastic members respectively fitted at first and second locations axially spaced away from each other;

the first location is one of an abutting portion between the housing and the yoke and a housing portion axially outside the yoke;

the second location is one of an abutting portion between the yoke and the end frame and an end frame portion axially outside the yoke;

the thermal insulation cover has a central part located around the yoke and a first axial end part located around the first location;

an inner diameter of the central part is smaller than that of the first axial end part; and an outer diameter of the elastic member is larger than the inner diameter of the first axial end part.

9. The starter according to claim 8, wherein:

the thermal insulation cover has a stepped part between the first axial end part and the central part; and the stepped part is in tight contact with the elastic member.

10. The starter according to claim 8, wherein:

the thermal insulation cover further has a second axial end parts located respectively around the second location;

an inner diameter of the central part is smaller than that of the second axial end part; and an outer diameter of the elastic member is larger than the inner diameter of the second axial end part.

11. The starter according to claim 10, wherein:

the thermal insulation cover has first and second stepped parts between the first axial end part and the central part and between the second axial end part and the central part, respectively; and the first and the second stepped parts are in tight contact with respective ones of the elastic members.

12. A starter comprising:

a yoke forming a magnetic path for a starter motor;

a housing and an end frame attached to respective axial end sides of the yoke and forming a starter frame together with the yoke, the starter frame having a yoke-side part of the housing and a yoke-side part of the end frame;

a thermal insulation cover surrounding an outer peripheral surface of the starter frame; and two elastic members disposed between the starter frame and the thermal insulation cover and supporting the thermal insulation cover to be radially spaced apart from the starter frame, wherein the elastic members each have a ring shape, are fitted circumferentially around the starter frame and are in tight contact with the outer peripheral surface of the starter frame and an inner peripheral surface of the thermal insulation cover, the elastic members are respectively fitted at first and second locations axially spaced away from each other, the first location is one of an abutting portion between the housing and the yoke and a housing portion axially outside the yoke, the second location is one of an abutting portion between the yoke and the end frame and an end frame portion axially outside the yoke, the thermal insulation cover has a central part located around the yoke and a first axial end part located around the first location;

an inner diameter of the central part is smaller than that of the first axial end part; and an outer diameter of the elastic member is larger than the inner diameter of the first axial end part.

13. The starter according to claim 12, wherein:

a groove is formed circumferentially at the first location on the outer peripheral surface of the starter frame; and the elastic member is fitted on the groove with the outer peripheral surface thereof being pressed radially inward by the first axial end part to fill in the groove.

14. The starter according to claim 12, wherein:

the thermal insulation cover has a stepped part between the first axial end part and the central part; and the stepped part is in tight contact with the elastic member.

15. The starter according to claim 12, wherein:

the thermal insulation cover further has a second axial end parts located respectively around the second location;

an inner diameter of the central part is smaller than that of the second axial end part; and an outer diameter of the elastic member is larger than the inner diameter of the second axial end part.

16. The starter according to claim 15, wherein:

first and second grooves are formed circumferentially at the first and second locations on the outer peripheral surface of the starter frame respectively; and the elastic member is fitted on each of the first and second grooves with the outer peripheral surface thereof being pressed radially inward by the first and second axial end parts to fill in the first and second grooves.

17. The starter according to claim 15, wherein:

the thermal insulation cover has first and second stepped parts between the first axial end part and the central part and between the second axial end part and the central part, respectively; and the first and the second stepped parts are in tight contact with respective ones of the elastic members.

18. A starter comprising:

a yoke forming a magnetic path for a starter motor;

a housing and an end frame attached to respective axial end sides of the yoke and forming a starter frame together with the yoke, the starter frame having a yoke-side part of the housing and a yoke-side part of the end frame;

a thermal insulation cover surrounding an outer peripheral surface of the starter frame, the thermal insulation cover having a radially enlarged part at an axial end thereof; and at least one elastic member disposed between the starter frame and the thermal insulation cover at a position radially inward of the enlarged part and supporting the thermal insulation cover to be radially spaced apart from the starter frame.

19. The starter according to claim 18, wherein:

the thermal insulation cover is made of metal; and each elastic member in said at least one elastic member has a ring shape, is fitted circumferentially around the starter frame and is in tight contact with the outer peripheral surface of the starter frame and an inner peripheral surface of the radially enlarged part of the thermal insulation cover.

20. The starter according to claim 19, wherein:

said at least one elastic member includes two elastic members respectively fitted at first and second locations axially spaced away from each other;

the first location is one of an abutting portion between the housing and the yoke and a housing portion axially outside the yoke; and the second location is one of an abutting portion between the yoke and the end frame and an end frame portion axially outside the yoke.

21. The starter according to claim 18, wherein: the thermal insulation cover is made of metal and has an end portion which substantially surrounds an axial end surface of the end frame.

* * * * *